United States Patent
Nihei et al.

(10) Patent No.: US 8,751,130 B2
(45) Date of Patent: Jun. 10, 2014

(54) VEHICLE TRAVEL CONTROL APPARATUS

(75) Inventors: Toshihisa Nihei, Toyota (JP); Takashi Nonaka, Ichinomiya (JP)

(73) Assignees: Toyota Jidosha Kabushiki Kaisha, Toyota-shi (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 13/824,595

(22) PCT Filed: Sep. 22, 2011

(86) PCT No.: PCT/IB2011/002356
§ 371 (c)(1),
(2), (4) Date: Mar. 18, 2013

(87) PCT Pub. No.: WO2012/038823
PCT Pub. Date: Mar. 29, 2012

(65) Prior Publication Data
US 2013/0179004 A1 Jul. 11, 2013

(30) Foreign Application Priority Data
Sep. 22, 2010 (JP) ................... 2010-212083

(51) Int. Cl.
*B60T 7/12* (2006.01)
*B60T 8/1755* (2006.01)

(52) U.S. Cl.
CPC ......... *B60T 8/17554* (2013.01); *B60T 2201/16* (2013.01); *B60T 8/1755* (2013.01)
USPC .................... 701/82; 701/1; 701/38

(58) Field of Classification Search
CPC ................................. B60G 17/0162
USPC .................................... 701/82, 1, 38
See application file for complete search history.

(56) References Cited

U.S. PATENT DOCUMENTS

| 6,289,272 B1 | 9/2001 | Batistic et al. |
| 6,431,663 B1 | 8/2002 | Fennel et al. |
| 7,571,039 B2 * | 8/2009 | Chen et al. ............ 701/38 |
| 2007/0114732 A1 * | 5/2007 | Dellacha ............ 280/5.52 |
| 2007/0267916 A1 | 11/2007 | Mackovjak et al. |
| 2008/0040000 A1 * | 2/2008 | Chen et al. ............ 701/38 |
| 2008/0120003 A1 | 5/2008 | Nihei |

FOREIGN PATENT DOCUMENTS

| JP | 11 49020 | 2/1999 |
| JP | 2006 103517 | 4/2006 |
| JP | 2008 126858 | 6/2008 |

OTHER PUBLICATIONS

International Search Report Issued Jan. 16, 2012 in PCT/IB11/02356 Filed Sep. 22, 2011.

\* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

A vehicle travel control apparatus executes turning facilitation control that controls wheel longitudinal force such that the longitudinal force of a turning path inner side wheel becomes smaller than the longitudinal force of a turning path outer side wheel, and vehicle dynamics control that controls wheel longitudinal force so as to stabilize the turning motion of the vehicle. The vehicle speed range in which to permit the turning facilitation control is lower than the vehicle speed range in which to permit the vehicle dynamics control.

18 Claims, 6 Drawing Sheets

VEHICLE TRAVEL CONTROL APPARATUS

BACKGROUND OF THE INVENTION

1. Field of the Invention

The invention relates to a vehicle travel control apparatus, and more particularly to a vehicle travel control apparatus that executes turning facilitation control that controls wheel longitudinal force(s) such that the longitudinal force of a turning path inner side wheel becomes smaller than the longitudinal force of a turning path outer side wheel, and vehicle dynamics control that controls wheel longitudinal force(s) so as to stabilize the turning motion of the vehicle.

2. Description of Related Art

For example, turning facilitation control is known which enhances the turning performance of the vehicle by applying braking force to the turning path inner side rear wheel, as described in Japanese Patent Application Publication No. 11-49020. Meanwhile, for example, vehicle dynamics control is known which stabilizes the turning motion of the vehicle by applying braking force to a control target wheel(s) determined as needed.

The control target wheel(s) for such turning facilitation control and the control target wheel(s) for such vehicle dynamics control do not always coincide with each other, and these controls execute different control procedures, and thus they may interfere with or conflict with each other. Therefore, when the turning facilitation control and the vehicle dynamics control both need to be executed, preferably, only one of them is executed.

As such, in a situation where the turning facilitation control and the vehicle dynamics control both need to be executed, only the one with a higher priority (which is, normally, the vehicle dynamics control) may be executed. In such a case, however, various determination processes for determining both whether the turning facilitation control needs to be executed and whether the vehicle dynamics control needs to be executed are constantly executed, and if they both need to be executed, the control with a higher priority is selected, making the control complicated or troublesome.

SUMMARY OF THE INVENTION

The invention provides vehicle travel control apparatuses that minimize the necessity of determining both whether turning facilitation control needs to be executed and whether vehicle dynamics control needs to be executed and then selecting the control with a higher priority and/or minimize the frequency at which such determination and selection are made.

An aspect of the invention relates to a vehicle travel control apparatus that executes a turning facilitation control that controls wheel longitudinal force such that a longitudinal force of a turning path inner side wheel becomes smaller than a longitudinal force of a turning path outer side wheel, and a vehicle dynamics control that controls wheel longitudinal force so as to stabilize turning motion of the vehicle, wherein a vehicle speed range in which to permit the turning facilitation control is lower than a vehicle speed range in which to permit the vehicle dynamics control. Meanwhile, in the invention, "turning path outer side wheel" is the wheel at the outer side of the turning locus, and "turning path inner side wheel" is the wheel at the inner side of the turning locus.

Typically, turning facilitation control is required in cases where the friction coefficient of the road surface is smaller than normal, such as during off-roading, and therefore sufficient turning lateral forces can not be generated. Thus, the vehicle speed ranges where the turning facilitation control is required are low, such as extremely low vehicle speed ranges. In contrast, the vehicle speed ranges where the vehicle may oversteer or understeer, while it is turning, to such an extent that the dynamic state of the vehicle becomes unstable are relatively high, such as middle-to-high speed ranges.

According to the vehicle travel control apparatus of the aspect of the invention, the vehicle speed range in which to permit the turning facilitation control is set lower than the vehicle speed range in which to permit the vehicle dynamics control. Therefore, even if the vehicle speed range in which to permit the turning facilitation control and the vehicle speed range in which to permit the vehicle dynamics control overlap, even partially, with each other, the necessity of determining both whether the turning facilitation control needs to be executed and whether the vehicle dynamics control needs to be executed and then selecting the control with a higher priority, and/or the frequency at which such determination and selection are made can be minimized.

For example, only the turning facilitation control may be permitted in a vehicle speed range that is included in the vehicle speed range in which to permit the turning facilitation control and is lower than the lower limit value of the vehicle speed range in which to the vehicle dynamics control. Conversely, only the vehicle dynamics control may be permitted in a vehicle speed range that is included in the vehicle speed range in which to permit the vehicle dynamics control and is higher than the upper limit value of the vehicle speed range in which to permit the turning facilitation control.

Further, in a case where the vehicle speed range in which to permit the turning facilitation control and the vehicle speed range in which to permit the vehicle dynamics control do not overlap each other, there is no need of determining both whether the turning facilitation control needs to be executed and whether the vehicle dynamics control needs to be executed and then selecting the control with a higher priority. That is, it is not necessary to determine whether the vehicle dynamics control needs to be executed, in the vehicle speed range in which to permit the turning facilitation control, while it is not necessary to determine whether the turning facilitation control needs to be executed, in the vehicle speed range in which to permit the vehicle dynamics control.

Further, the vehicle travel control apparatus of the aspect of the invention may be such that the vehicle dynamics control includes an oversteer reduction control, and an upper limit value of the vehicle speed range in which to permit the turning facilitation control is lower than a lower limit value of a vehicle speed range in which to permit the oversteer reduction control.

According to the structure described above, the upper limit value of the vehicle speed range in which to permit the turning facilitation control is lower than the lower limit value of the vehicle speed range in which to permit the oversteer reduction control. Thus, the vehicle speed range in which to permit the turning facilitation control and the vehicle speed range in which to permit the vehicle dynamics control do not overlap each other, and therefore there is no need of determining both whether the turning facilitation control needs to be executed and whether the vehicle dynamics control needs to be executed and then selecting the control with a higher priority.

Further, the vehicle travel control apparatus of the aspect of the invention may be such that the vehicle dynamics control includes an oversteer reduction control, the upper limit value of the vehicle speed range in which to permit the turning facilitation control is higher than a lower limit value of a vehicle speed range in which to permit the oversteer reduction control, and the lower limit value of the vehicle speed range in which to permit the turning facilitation control is lower than a lower limit value of a vehicle speed range in which to permit the oversteer reduction control.

According to the structure described above, although the upper limit value of the vehicle speed range in which to permit the turning facilitation control is higher than the lower limit value of the vehicle speed range in which to permit the oversteer reduction control, the lower limit value of the vehicle speed range in which to permit the turning facilitation control is lower than the lower limit value of the vehicle speed range in which to permit the oversteer reduction control. Therefore, the vehicle speed range in which to permit the turning facilitation control and the vehicle speed range in which to permit the oversteer reduction control do not overlap each other in a vehicle speed range higher than the upper limit value of the vehicle speed range in which to permit the turning facilitation control and in a vehicle speed range lower than the lower limit value of the vehicle speed range in which to permit the oversteer reduction control. Thus, in such non-overlapped vehicle speed ranges, there is no need of determining both whether the turning facilitation control needs to be executed and whether the oversteer reduction control needs to be executed and then selecting the control with a higher priority.

Further, the vehicle travel control apparatus of the aspect of the invention may be such that the turning facilitation control is not started even when a condition for starting the turning facilitation control is satisfied during execution of the oversteer reduction control if the speed of the vehicle is in a vehicle speed range between the lower limit value of the vehicle speed range in which to permit the oversteer reduction control and the upper limit value of the vehicle speed range in which to permit the turning facilitation control.

According to the structure described above, since the turning facilitation control is not started when the condition for starting the turning facilitation control is satisfied during execution of the oversteer reduction control, it is possible to prevent the oversteer reduction control and the turning facilitation control from interfering with and conflicting with each other.

Further, the vehicle travel control apparatus of the aspect of the invention may be such that the turning facilitation control is discontinued when a condition for starting the oversteer reduction control is satisfied during execution of the turning facilitation control if the speed of the vehicle is in a vehicle speed range between the lower limit value of the vehicle speed range in which to permit the oversteer reduction control and the upper limit value of the vehicle speed range in which to permit the turning facilitation control.

According to the structure described above, since the turning facilitation control is discontinued when the condition for starting the oversteer reduction control is satisfied during execution of the turning facilitation control, it is possible to prevent the turning facilitation control and the oversteer reduction control from interfering with and conflicting with each other.

Further, the vehicle travel control apparatus of the aspect of the invention may be such that the vehicle dynamics control includes an oversteer reduction control and an understeer reduction control, and the upper limit value of the vehicle speed range in which to permit the turning facilitation control is lower than a lower limit value of a vehicle speed range in which to permit the understeer reduction control.

According to the structure described above, since the vehicle speed range in which to permit the turning facilitation control does not overlap the vehicle speed range in which to permit the understeer reduction control, it is possible to prevent the turning facilitation control and the understeer reduction control from interfering with and conflicting with each other.

Meanwhile, in the invention, "longitudinal force" of each wheel is driving/braking force that is deemed as "positive" when acting in the direction the vehicle is propelled. Reduction of such longitudinal force may be accomplished not only by reducing the level of the longitudinal force in the vehicle propelling direction, but also by applying longitudinal force acting in the direction opposite to the vehicle propelling direction, to the wheel generating the longitudinal force in the vehicle propelling direction.

In the invention, further, "turning path inner side rear wheel" represents the turning path inner side wheel located at the rear side with respect to the vehicle propelling direction. More specifically, "rear wheel" included in the term "turning path inner side rear wheel" represents the rear wheel at the inner side of the turning path of the vehicle when the vehicle is propelled forward, while it represents the front wheel at the inner side of the turning path of the vehicle when the vehicle is propelled rearward.

The vehicle travel control apparatuses of the aspects of the invention may be such that the turning facilitation control is control that exerts on the vehicle a yaw moment directed to facilitate the turning of the vehicle by applying braking force to at least one turning path inner side wheel.

The vehicle travel control apparatuses described above may be such that the at least one turning path inner side wheel is the turning path inner side rear wheel.

The vehicle travel control apparatuses of the aspects of the invention may be such that the vehicle dynamics control is control that stabilizes the turning motion of the vehicle by applying braking force to at least one control target wheel.

The vehicle travel control apparatuses of the aspects of the invention may be such that the lower limit value of the vehicle speed range in which to permit the turning facilitation control is 0.

The vehicle travel control apparatuses of the aspects of the invention may be such that the oversteer reduction control is control that applies braking force to at least the turning path outer side front wheel so that a yaw moment directed to suppress the turning of the vehicle is exerted on the vehicle and the vehicle is decelerated.

The vehicle travel control apparatuses of the aspects of the invention may be such that the understeer reduction control is control that applies braking force to at least the turning path inner side rear wheel so that the vehicle is decelerated and a yaw moment directed to facilitate the turning of the vehicle is exerted on the vehicle.

The vehicle travel control apparatuses of the aspects of the invention may be such that the vehicle is an off-road vehicle.

The vehicle travel control apparatuses of the aspects of the invention may be such that the turning facilitation control applies braking force to the turning path inner side rear wheel until the turning path inner side rear wheel is locked.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
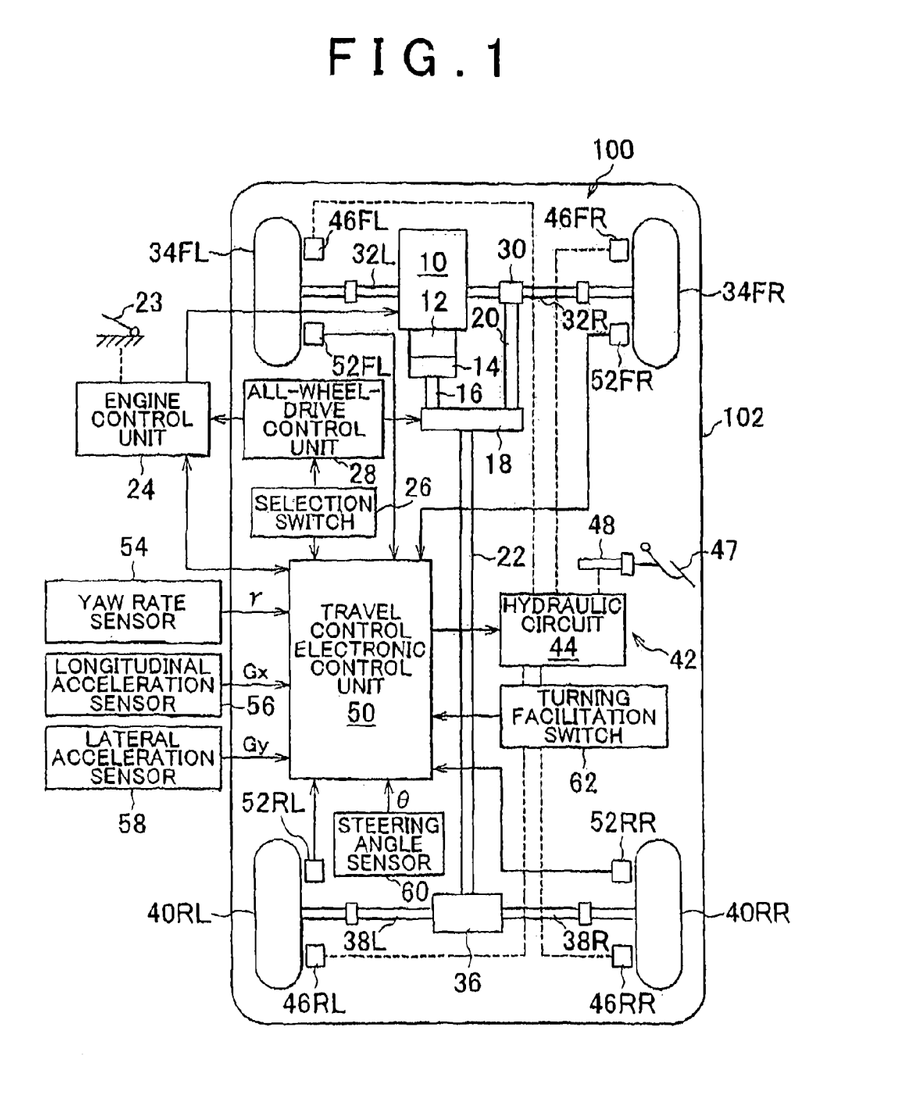
FIG. 1 is a view schematically showing the configuration of a vehicle travel control apparatus of the first example embodiment of the invention, which is incorporated in an all-wheel-drive vehicle.

FIG. 1 schematically shows the configuration of a vehicle travel control apparatus of the first example embodiment of the invention, which is incorporated in an all-wheel-drive vehicle.

FIG. 1 shows the overall configuration of a vehicle travel control apparatus 100 incorporated in a vehicle 102. The drive force of an engine 10 is transmitted to an output shaft 16 via a torque converter 12 and a transmission 14. The drive force of the output shaft 16 is transmitted to both a front wheel drive shaft 20 and a rear wheel drive shaft 22 or to only the rear wheel drive shaft 22 via a transfer 18 that performs drive mode switching. An engine control unit 24 controls the output of the engine 10 in accordance with the travel of an accelerator pedal 23 stepped down by, the driver, etc.

The transfer 18 has an actuator for switching the drive mode between an all-wheel-drive mode(s) and a two-wheel-drive mode, and an all-wheel-drive control unit 28 controls the actuator in response to a selection switch (SW) 26 operated by the driver. The selection switch 26 is switched between positions H4, H2, N, and L4.

When the selection switch 26 is in the position H4, the transfer 18 is placed in an all-wheel-drive mode in which the drive force of the output shaft 16 is transmitted to both the front wheel drive shaft 20 and the rear wheel drive shaft 22. When the selection switch 26 is in the position H2, the transfer 18 is placed in a two-wheel-drive mode in which the drive force of the output shaft 16 is transmitted only to the rear wheel drive shaft 22. When the selection switch 26 is in the position N, the transfer 18 is placed in a mode in which the drive force of the output shaft 16 is neither transmitted to the front wheel drive shaft 20 nor to the rear wheel drive shaft 22. When the selection switch 26 is in the position LA, the transfer 18 is placed in another all-wheel-drive mode in which the drive force of the output shaft 16 is transmitted, as drive force of torque for low speed vehicle drive that is larger than the torque in the H4 all-wheel-drive mode, to both the front wheel drive shaft 20 and the rear wheel drive shaft 22.

Referring to FIG. 1, in accordance with command signals input from the selection switch 26, the all-wheel-drive control unit 28 outputs to the engine control unit 24 signals indicating in which mode among the two-wheel-drive mode and all-wheel-drive modes described above the transfer 18 is required to be set by the all-wheel-drive control unit 28. The engine control unit 24 controls the output of the engine 10 according to the transfer mode required by the all-wheel-drive control unit 28.

The drive force of the front wheel drive shaft 20 is transmitted to a left front wheel axle 32L and a right front wheel axle 32R via a front wheel differential 30, thereby rotating a left front wheel 34FL and a right front wheel 34FR, while the drive force of the rear wheel drive shaft 22 is transmitted to a left rear wheel axle 38L and a right rear wheel axle 38R via a rear wheel differential 36, thereby rotating a left rear wheel 40RL and a right rear wheel 40RR.

The braking forces applied to the left front wheel 34FL, the right front wheel 34FR, the left rear wheel 40RL, and the right rear wheel 40RR, respectively, are controlled by a hydraulic circuit 44 of a brake system 42 controlling the braking pressures of wheel cylinders 46FL, 46FR, 46RL, and 46RR corresponding, respectively, to the left front wheel 34FL, the right front wheel 34FR, the left rear wheel 40RL, and the right rear wheel 40RR. The hydraulic circuit 44 is, although not shown in the drawings, provided with a reservoir(s), an oil pump(s), various valves, etc. The braking pressures of the respective wheel cylinders 46FL, 46FR, 46RL, and 46RR are normally controlled by a master cylinder 48 that is driven by a brake pedal 47 being stepped down by the driver, and they are also controlled, when required, by a travel control electronic control unit (ECU) 50, as will be described in detail later.

The ECU 50 receives signals indicative of wheel speeds Vfl, Vfr, Vrl, and Vrr of the left and right front wheels and left and right rear wheels from wheel speed sensors 52FL, 52FR, 52RL, and 52RR, respectively, and receives signals indicative of a yaw rate $\gamma$ of the vehicle from a yaw rate sensor 54. Further, the ECU 50 receives signals indicative of a longitudinal acceleration Gx and a lateral acceleration Gy of the vehicle from a longitudinal acceleration sensor 56 and a lateral acceleration sensor 58, respectively. Further, the ECU 50 receives signals indicative of a steering angle $\theta$ from a steering angle sensor 60. The yaw rate sensor 54, the lateral acceleration sensor 58, and the steering angle sensor 60 are used to detect, for example, the lateral acceleration of the vehicle that is determined as "positive" when occurring in the counter-clockwise turning direction, and the longitudinal acceleration sensor 56 is used to detect the longitudinal acceleration of the vehicle that is determined as "positive" when occurring in the direction the vehicle is accelerated.

The ECU 50 receives, from the selection switch 26, signals indicative of in which mode the transfer 18 is presently set, and also receives, from a turning facilitation switch 62 operated by an occupant of the vehicle, signals indicative of whether the turning facilitation switch 62 is presently ON.

Further, the engine control unit 24 receives signals indicative of an acceleration operation amount Ace from an acceleration operation amount sensor (not shown in FIG. 1) provided at the accelerator pedal 23. Note that, in practice, the engine control unit 24, the all-wheel-drive control unit 28, and the ECU 50 may, for example, be integrated into a combination of a drive circuit(s) and a single microcomputer incorporating a CPU (Central Processing Unit), a ROM (Read Only Memory), a RAM (Random Access Memory), and various input and output portions.

As will be described later in detail, when the turning facilitation switch 62 is ON, the ECU 50 determines whether control force application under turning facilitation control should be executed. If the ECU 50 determines that the same control force application should be executed, the ECU 50 applies braking force to the rear wheel at the inner side of the turning path of the vehicle so as to exert a turning facilitation yaw moment on the vehicle.

Further, the ECU 50 determines whether the vehicle is excessively oversteering or understeering and therefore control force application under vehicle dynamics control needs to be executed. If the ECU 50 determines that the same control force application needs to be executed, the ECU 50 executes oversteer reduction control or understeer reduction control for stabilizing the turning motion of the vehicle by applying braking force to a control target wheel(s).

More specifically, the oversteer reduction control applies braking force to at least the turning path outer side front wheel so that a yaw moment directed to suppress the turning of the vehicle is exerted on the vehicle and the vehicle is decelerated. Meanwhile, the understeer reduction control applies braking forces to at least the left and right rear wheels, respectively, such that the braking force on the turning path inner side rear wheel becomes larger than the braking force on the turning path outer side rear wheel, so that the vehicle is decelerated and a yaw moment directed to facilitate the turning of the vehicle is exerted on the vehicle.

As will be described in detail later, the vehicle speed ranges in which to permit, respectively, the control force application under the turning facilitation control, the control force application under the oversteer reduction control, and the control force application under the understeer reduction control are set in advance.

More specifically, in the first example embodiment, the control force application under the turning facilitation control is permitted when a vehicle speed V, which is calculated based on the wheel speeds Vfl to Vrr, is equal to or lower than a reference value (upper limit value) Vta (a positive constant) for determining whether to permit the turning facilitation control. The control force application under the oversteer reduction control is permitted when the vehicle speed V is equal to or higher than a reference value (lower limit value) Vsp (a positive constant) for determining whether to permit the oversteer reduction control. The control force application under the understeer reduction control is permitted when the vehicle speed V is equal to or higher than a permission vehicle speed lower limit value Vdr (a positive constant larger than Vsp).

The reference value Vsp is set equal to or smaller than the reference value Vta, but the permission vehicle speed lower limit value Vdr is set larger than the reference value Vta. Note that the permission vehicle speed lower limit value Vdr is set, under no circumstance, equal to or smaller than the reference value Vta. As such, the vehicle speed range in which to permit the control force application under the turning facilitation control does not overlap the vehicle speed range in which to permit the control force application under the understeer reduction control.

On the other hand, the vehicle speed range in which to permit the control force application under the turning facilitation control overlaps the vehicle speed range in which to permit the control force application under the oversteer reduction control. Thus, the conditions for executing the control force application under the turning facilitation control and those for executing the control force application under the oversteer reduction control may be satisfied at the same time. In such a case, priority is given to executing the control force application under the oversteer reduction control. Note that an upper limit value of the vehicle speed range in which to permit the control force application under the oversteer reduction control may be set.

Next, the procedure of the turning facilitation control in the first example embodiment will be described with reference to the flowchart illustrated in FIG. 2. Note that the control illustrated in the flowchart of FIG. 2 is started in response to an ignition switch (not shown in the drawings) being turned on and is repeated at given time intervals.

Figure 2:
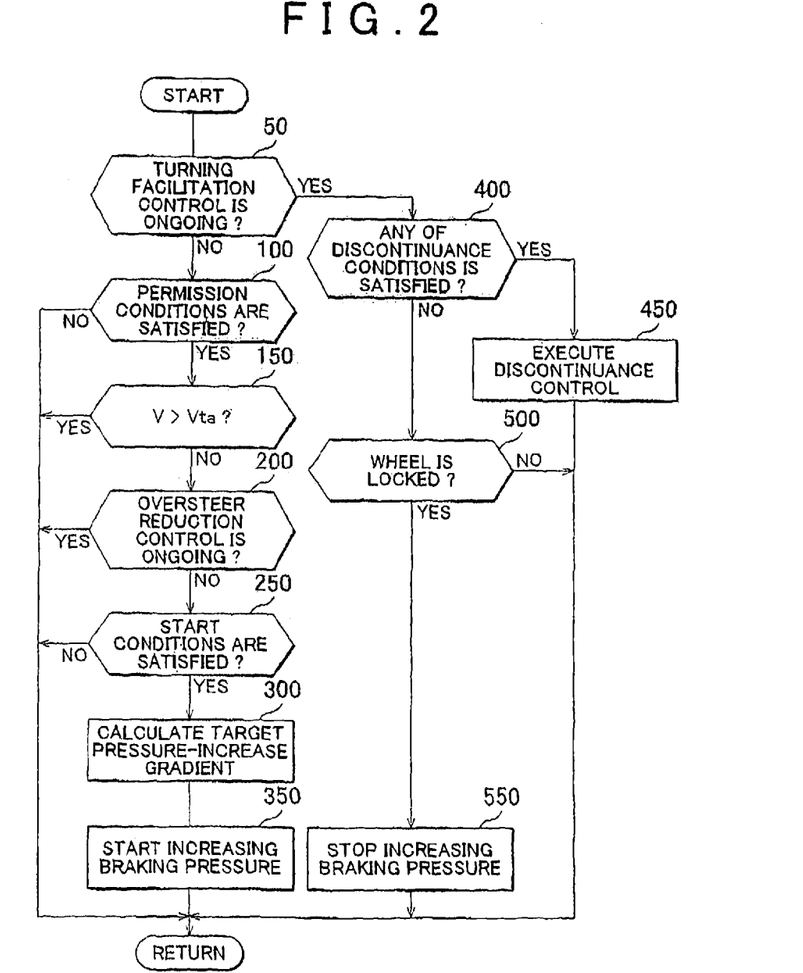
FIG. 2 is a flowchart illustrating the procedure of turning facilitation control in the first example embodiment.

Referring to FIG. 2, it is first determined in step 50 whether the braking force application under the turning facilitation control is presently executed, that is, whether braking force is being applied to the turning path inner side rear wheel. If the result of the determination is positive (YES), the control proceeds to step 400. If the result of the determination is negative (NO), on the other hand, the control proceeds to step 100.

In step 100, it is determined whether the conditions for permitting the braking force application under the turning facilitation control are presently satisfied. If the result of the determination is negative (NO), the present cycle of the control is finished. If the result of the determination is positive (YES), then, the control proceeds to step 150.

The conditions for permitting the braking force application under the turning facilitation control may be the following three conditions: the respective sensors and the brake system 42 being in normal conditions, allowing proper execution of the vehicle dynamics control (condition A1); the selection switch 26 being in the position L4 (condition A2); and the turning facilitation switch 62 being in the ON position (condition A3). In this case, that is, the braking force application under the turning facilitation control are permitted only when these three conditions are all satisfied.

Next, in step 150, it is determined whether the vehicle speed V is higher than the reference value Vta for the determination for permitting the turning facilitation control, that is, whether the vehicle speed V is of a value with which the turning facilitation control is not permitted. If the result of determination is positive (YES), the present cycle of the control is finished. If the result of the determination is negative (NO), on the other hand, the control proceeds to step 200.

Next, in step 200, it is determined whether the oversteer reduction control, which is included the vehicle dynamics control, is presently executed. If the result of the determination is positive (YES), the present cycle of the control is finished. If the result of the determination is negative (NO), on the other hand, the control proceeds to step 250.

Next, in step 250, it is determined whether the conditions for starting the braking force application under the turning facilitation control are presently satisfied. If the result of the determination is negative (NO), the present cycle of the control is finished. If the result of the determination is positive (YES), on the other hand, the control proceeds to step 300.

For example, the conditions for starting the braking force application under the turning facilitation control may be the following two conditions: the absolute value of the steering angle θ being equal to or larger than a reference value θtas (condition B1); and the accelerator pedal 23 being stepped down (condition B2). In this case, that is, the braking force application under the turning facilitation control are allowed to be started only when these two conditions are both satisfied. Note that the reference value θtas may either be a positive constant or a variable that is set in accordance with the vehicle speed V such that the lower the vehicle speed V, the larger the reference value θtas.

Next, in step 300, a target pressure-increase gradient ΔPbrint for the turning path inner side rear wheel is calculated based on the absolute value of the steering angle θ, such that the larger the absolute value of the steering angle θ, the larger the target pressure-increase gradient ΔPbrint. Note that the target pressure-increase gradient ΔPbrint may be variably set in accordance with the vehicle speed V such that the lower the vehicle speed V, the larger the target pressure-increase gradient ΔPbrint.

Next, in step 350, the braking pressure on the turning path inner side rear wheel is controlled such that the pressure-increase gradient for the turning path inner side rear wheel equals the target pressure-increase gradient ΔPbrint, thus starting applying braking force to the turning path inner side rear wheel.

Meanwhile, in step 400, it is determined whether the condition for discontinuing the braking force application under the turning facilitation control is presently satisfied. If the result of the determination is negative (NO), the control proceeds to step 500. If the result of the determination is positive (YES), on the other hand, the control proceeds to step 450.

The condition for discontinuing the braking force application under the turning facilitation control may be any of the following five conditions: the absolute value of the steering angle θ having become equal to or smaller than a reference value θtae (a positive constant) for finishing the control (condition C1); the turning facilitation switch 62 having been switched to the OFF position (condition C2); the vehicle speed V having exceeded the reference value Vta for the determination for permitting the turning facilitation control (condition C3); a need of executing the braking force application under the oversteer reduction control having arisen (condition C4); and a situation having occurred where the vehicle dynamics control can not be executed properly (condition C5). In this case, that is, the braking force application under the turning facilitation control is discontinued when any one of these five conditions is satisfied.

Next, in step 450, the braking pressure on the turning path inner side rear wheel is reduced, whereby the braking force application to the turning path inner side rear wheel is discontinued.

Meanwhile, in step 500, a braking slip rate Sbrin of the turning path inner side rear wheel is calculated, and then whether the turning path inner side rear wheel is presently locked is determined based on the braking slip rate Sbrin. If the result of the determination is negative (NO), the present cycle of the control is finished. If the result of the determination is positive (YES), on the other hand, the control proceeds to step 550, the increasing of the braking pressure on the turning path inner side rear wheel is discontinued, whereby the increasing of the braking force on the turning path inner side rear wheel is discontinued.

Next, the procedure of the vehicle dynamics control in the first example embodiment will be described with reference to the flowchart shown in FIG. 3. Note that the control illustrated by the flowchart of FIG. 3 is started in response to the ignition switch (not shown in the drawings) being turned on and is repeated at given time intervals.

Figure 3:
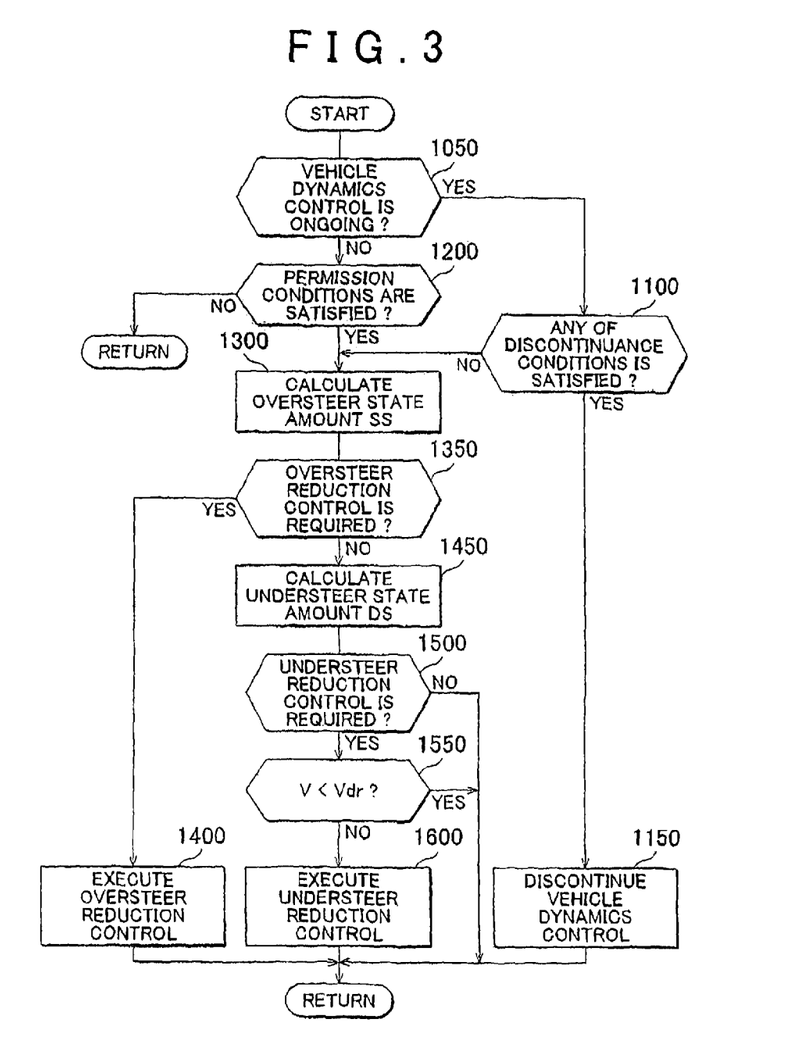
FIG. 3 is a flowchart illustrating the procedure of vehicle dynamics control in the first example embodiment.

Referring to FIG. 3, it is first determined in step 1050 whether the braking force application under the vehicle dynamics control is presently executed. If the result of the determination is negative (NO), the control proceeds to step 1200. If the result of the determination is positive (YES), on the other hand, the control proceeds to step 1100.

In step 1100, it is determined whether the condition for discontinuing the vehicle dynamics control is presently satisfied. If the result of the determination is negative (NO), the control proceeds to step 1300. If the result of the determination is positive (YES), on the other hand, the control proceeds to step 1150.

The condition for discontinuing the vehicle dynamics control may be any one of the following four conditions: an oversteer state amount SS having become equal to or smaller than a control discontinuance reference value SSe (a positive constant) when the oversteer reduction control is executed as the vehicle dynamics control (condition D1); an understeer state amount DS having become equal to or smaller than a control discontinuance reference value DSe (a positive constant) when the understeer reduction control is executed as the vehicle dynamics control (condition D2); a situation having occurred where the vehicle dynamics control can not be properly executed, due to one or more of the sensors or the brake system 42 being in an abnormal condition (condition D3); and the vehicle speed V having become lower than the reference value Vsp (a positive constant) for the determination for permitting the oversteer reduction control (condition D4). In this case, that is, the vehicle dynamics control is discontinued when any one of these four conditions is satisfied.

Next, in step 1150, the braking pressure(s) on the control target wheel(s) for the vehicle dynamics control is reduced, whereby the braking force application to the control target wheel(s) is discontinued.

Meanwhile, in step 1200, it is determined whether the conditions for permitting the vehicle dynamics control are presently satisfied. If the result of the determination is negative (NO), the present cycle of the control is finished. If the result of the determination is positive (YES), on the other hand, the control proceeds to step 1300.

The conditions for permitting the vehicle dynamics control may be the following two conditions: the sensors and the brake system 42 being in normal conditions; allowing proper execution of the vehicle dynamics control (condition E1); and the vehicle speed V being equal to or higher than the reference value Vsp for the determination for permitting the oversteer reduction control (condition E2). In this case, that is, the vehicle dynamics control is permitted only when these two conditions are both satisfied.

Next, the oversteer state amount SS is calculated in step 1300. The oversteer state amount SS may be any parameter indicative of the degree of oversteer of the vehicle, and it may be calculated in various manners. For example, the oversteer state amount SS may be calculated as follows. A skid acceleration Vyd of the vehicle, which is a lateral acceleration deviation known as the difference between the lateral acceleration Gy and the product of the vehicle speed V and the yaw rate γ (V·γ)(Gy−V·γ), is calculated, and a skid velocity Vy of the vehicle body is calculated by integrating the skid acceleration Vyd. Then, a slip angle β of the vehicle body is calculated as the ratio of the skid velocity Vy of the vehicle body to a longitudinal velocity Vx of the vehicle body (=the vehicle speed V) (Vy/Vx).

Then, an oversteer amount SV is calculated as a linear sum K1·β+K2·Vyd of the slip angle β and slid acceleration Vyd of the vehicle body, wherein K1 and K2 are positive constants, and the turning direction of the vehicle is determined based on the sign (plus or minus) of the yaw rate γ. When the vehicle is turning left, the oversteer state amount SS is calculated as "SV". When the vehicle is turning right, on the other hand, the oversteer state amount SS is calculated as "−SV". If the result of the calculation is a negative value, the oversteer amount is regarded as zero. Note that the oversteer amount SV may be calculated as a linear sum of the slip angle β of the vehicle body and a differential value βd of the slip angle β.

Next, in step 1350, it is determined whether the oversteer state amount SS is equal to or larger than a control start reference value SSs (a positive constant equal to or larger than SSe), that is, whether it is necessary to execute the oversteer reduction control. If the result of the determination is negative (NO), the control proceeds to step 1450. If the result of the determination is positive (YES), on the other hand, the control proceeds to step 1400.

Next, in step 1400, the oversteer reduction control is executed which reduces the degree of oversteer of the vehicle by reducing the yaw rate of the vehicle while decelerating the vehicle. Note that the oversteer reduction control may be executed in various manners For example, it may be executed as follows. A target braking slip rate Sfoutt for the turning path outer side front wheel is calculated such that the larger the oversteer state amount SS, the higher the target braking slip rate Sfoutt, and then the braking pressure on the turning path outer side front wheel is controlled such that the braking slip rate of the turning path outer side front wheel equals the target braking slip rate Sfoutt.

Next, the understeer state amount DS is calculated in step 1450. Note that the understeer state amount DS may be any parameter indicative of the degree of understeer of the vehicle, and it may be calculated in various manners. For example, the understeer state amount DS may calculated as follows. A target yaw rate γc is calculated using the equation (1) indicated below, wherein Kh is a stability factor, H is the wheelbase, and Rg is the steering gear ratio. Then, a reference yaw rate γt is calculated using the equation (2) indicated below, wherein T is a time constant and s is a Laplace operator. Note that the lateral acceleration Gy of the vehicle may be factored into the calculation of the target yaw rate ye to take a dynamic yaw rate(s) into account.

$$\gamma c = V \cdot \theta / (1 + Kh \cdot V^2) \cdot H / Rg \quad (1)$$

$$\gamma t = \gamma c / (1 + T \cdot s) \quad (2)$$

Then, an understeer amount DV is calculated using the equation (3) indicated below, and the turning direction of the vehicle is determined based on the sign (plus or minus) of the yaw rate γ. When the vehicle is turning left, the understeer state amount DS is calculated as "DV". When the vehicle is turning right, on the other hand, the understeer state amount DS is calculated as "−DV". If the result of the calculation is a negative value, the understeer state amount DS is regarded as zero. Note that the understeer amount DV may be calculated using the equation (4) indicated below.

$$DV = (\gamma t - \gamma) \quad (3)$$

$$DV = H \cdot (\gamma t - \gamma) / V \quad (4)$$

Next, in step 1500, it is determined whether the understeer state amount DS is equal to or larger than a control start reference value DSs (a positive constant equal to or larger than DSe), that is, whether it is necessary to execute the understeer reduction control. If the result of the determination is negative (NO), the present cycle of the control is finished. If the result of the determination is positive (YES), on the other hand, the control proceeds to step 1550.

Next, in step 1550, it is determined whether the vehicle speed V is lower than the permission vehicle speed lower limit value Vdr (a positive constant) for the understeer reduction control, that is, whether the vehicle speed V is of a value with which the understeer reduction control is permitted. If the result of the determination is positive (YES), the present cycle of the control is finished. If the result of the determination is negative (NO), on the other hand, the control proceeds to step 1600.

Next, in step 1600, the understeer reduction control is executed which reduces the degree of understeer of the vehicle by exerting on the vehicle a yaw moment for reducing the yaw rate of the vehicle while decelerating the vehicle.

Note that the understeer reduction control may be executed in various manners For example, it may be executed as follows. A target braking slip rate Sroutt for the turning path outer side rear wheel and a target braking slip rate Srint for the turning path inner side rear wheel are calculated such that the larger the understeer state amount DS, the higher the target braking slip rates Sroutt and Srint, and then the braking pressures on the turning path outer side rear wheel and the turning path inner side rear wheel are controlled such that the braking slip rate of the turning path outer side rear wheel equals the target braking slip rate Sroutt and the braking slip rate of the turning path inner side rear wheel equals the target braking slip rate Srint.

According to the first example embodiment, thus, when a situation occurs where the turning facilitation control needs to be started, in the control procedure illustrated in FIG. 2, a negative determination result (NO) is obtained in step 50, then a positive determination result (YES) is obtained in step 100, then a negative determination result (NO) is obtained in step 150, then a negative determination result (NO) is obtained in step 200, and then a positive determination result (YES) is obtained in step 250. Subsequently, braking force starts to be applied to the turning path inner side rear wheel through steps 300 and 350, after which the braking force on the turning path inner side rear wheel is increased until a positive determination result (YES) is obtained in step 400 or 500.

In this way, a yaw moment directed to facilitate the turning of the vehicle, which occurs due to the difference between the braking force on the left rear wheel and that on the right rear wheel, is exerted on the vehicle, facilitating the turning of the vehicle. As such, the turning performance of the vehicle becomes higher than it is when the braking force application under the turning facilitation control is not executed.

Meanwhile, when a situation occurs where the oversteer reduction control needs to be started, in the control procedure illustrated in FIG. 3, a negative determination result (NO) is obtained in step 1050, then a positive determination result (YES) is obtained in step 1200, and then a positive determination result (YES) is obtained in step 1350. Subsequently, through step 1400, braking force is applied to the control target wheel for the oversteer reduction control until a positive determination result (YES) is obtained in step 1100, thereby reducing the oversteer of the vehicle.

Meanwhile, when a situation occurs where the understeer reduction control needs to be started, a negative determination result (NO) is obtained in step 1050, then a positive determination result (YES) is obtained in step 1200, then a negative determination result (NO) is obtained in step 1350, then a positive determination result (YES) is obtained in step 1500, and then a negative determination result (NO) is obtained in step 1550. Subsequently, through step 1600, braking forces are applied to the control target wheels for the understeer reduction control until a positive determination result (YES) is obtained in step 1100, thereby reducing the understeer of the vehicle.

As described above, the vehicle speed (vehicle speed V) range in which to permit the braking force application under the turning facilitation control is from 0 to the reference value Vta, the vehicle speed range in which to permit the braking force application under the oversteer reduction control starts from the reference value Vsp, and the vehicle speed range in which to permit the braking force application under the understeer reduction control starts from the reference value Vdr.

Figure 6:
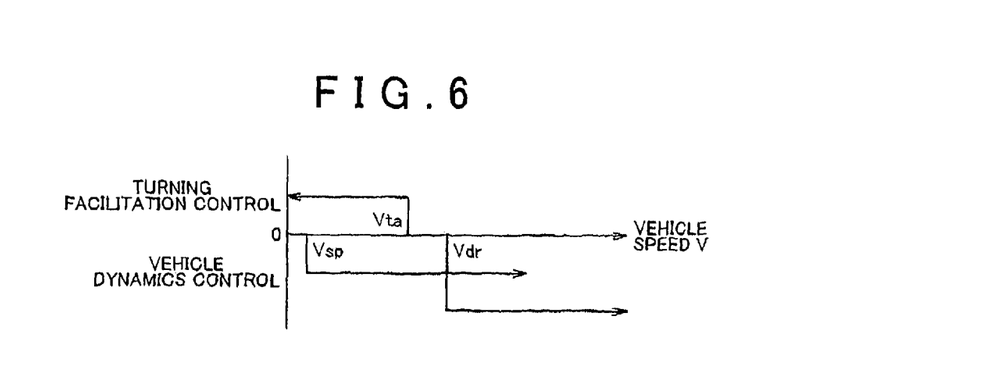
FIG. 6 is a chart illustrating the vehicle speed range in which to permit the braking force application under the turning facilitation control and the vehicle speed ranges in each of which to permit the braking force application under the vehicle dynamics control, in the first example embodiment.

Referring to FIG. 6, the reference value Vta is larger than the reference value Vsp, but it is smaller than the permission vehicle speed lower limit value Vdr. As such, the vehicle speed range in which to permit the braking force application under the turning facilitation control does not overlap the vehicle speed range in which to permit the braking force application under the understeer reduction control. Thus, the braking force application under the turning facilitation control and that under the understeer reduction control can be reliably prevented from interfering with and conflicting with each other.

Further, the lower limit value of the vehicle speed range in which to permit the braking force application under the turning facilitation control is 0, while the lower limit value Vsp of the vehicle speed range in which to permit the braking force application under the oversteer reduction control is a positive value larger than 0. Thus, when the vehicle speed V is in a range lower than the lower limit value Vsp, the braking force application under the oversteer reduction control is not permitted, but only the braking force application under the turning facilitation control is permitted, and therefore the braking force application under the turning facilitation control and that under the oversteer reduction control do not interfere with nor conflict with each other.

Since the yaw rate of the vehicle becomes high when the braking force application under the turning facilitation control is executed, a situation may occur where it is determined that the braking force application under the oversteer reduction control needs to be executed. In reality, however, it is often the case that the braking force application under the turning facilitation control is required during off-roading, or the like, when the vehicle speed V is in an extremely low vehicle speed range in which the braking force application under the oversteer reduction control is not permitted. Thus, during off-roading, or the like, the braking force application under the turning facilitation control is not hindered by the oversteer reduction control, and thus the turning performance of the vehicle can be effectively enhanced.

Further, the vehicle speed range in which to permit the braking force application under the turning facilitation control partially overlaps the vehicle speed range in which to permit the braking force application under the oversteer reduction control. However, if the braking force application under the oversteer reduction control is started in a state where the braking force application under the turning facilitation control is not executed, in the control procedure in FIG. 2, a positive determination result (YES) is obtained in step 200, and therefore steps 300 and 350 are not executed. Meanwhile, if the braking force application under the turning facilitation control is required in a state where the braking force application under the oversteer reduction control is executed, a negative determination result (NO) is obtained in step 100.

As such, in any of the cases stated above, the braking force application under the turning facilitation control and that under the oversteer reduction control are not executed at the same time, and thus they do not interfere with nor conflict with each other.

Further, if the braking force application under the oversteer reduction control is required in a state where the braking force application under the turning facilitation control is executed, in the control procedure in FIG. 2, positive determination results (YES) are obtained in steps 50 and 400, and then the braking force application under the turning facilitation control is discontinued in step 450. Thus, in this case, too, the braking force application under the turning facilitation control and that under the oversteer reduction control do not interfere with nor conflict with each other. Further, for example, even if the vehicle starts to oversteer as a result of execution of the braking force application under the turning facilitation control when the vehicle is traveling on a road, the braking force application under the turning facilitation control is discontinued, and the braking force application under the oversteer reduction control is started. Even in such a case, thus, the oversteer of the vehicle can be reliably reduced.

Figure 4:
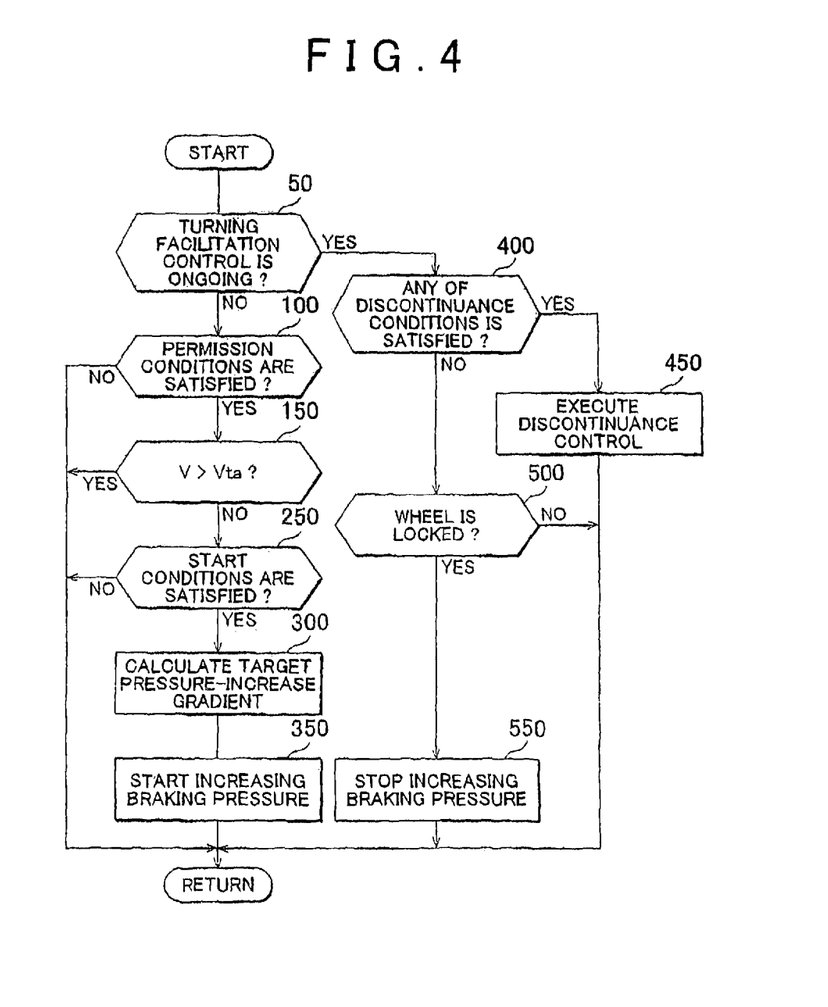
FIG. 4 is a flowchart illustrating the procedure of turning facilitation control in the second example embodiment.

The flowchart of FIG. 4 illustrates the procedure of turning facilitation control executed by a vehicle travel control apparatus of the second example embodiment of the invention, which is incorporated in an all-wheel-drive vehicle. The flowchart of FIG. 5 illustrates the procedure of vehicle dynamics control in the second example embodiment.

Figure 5:
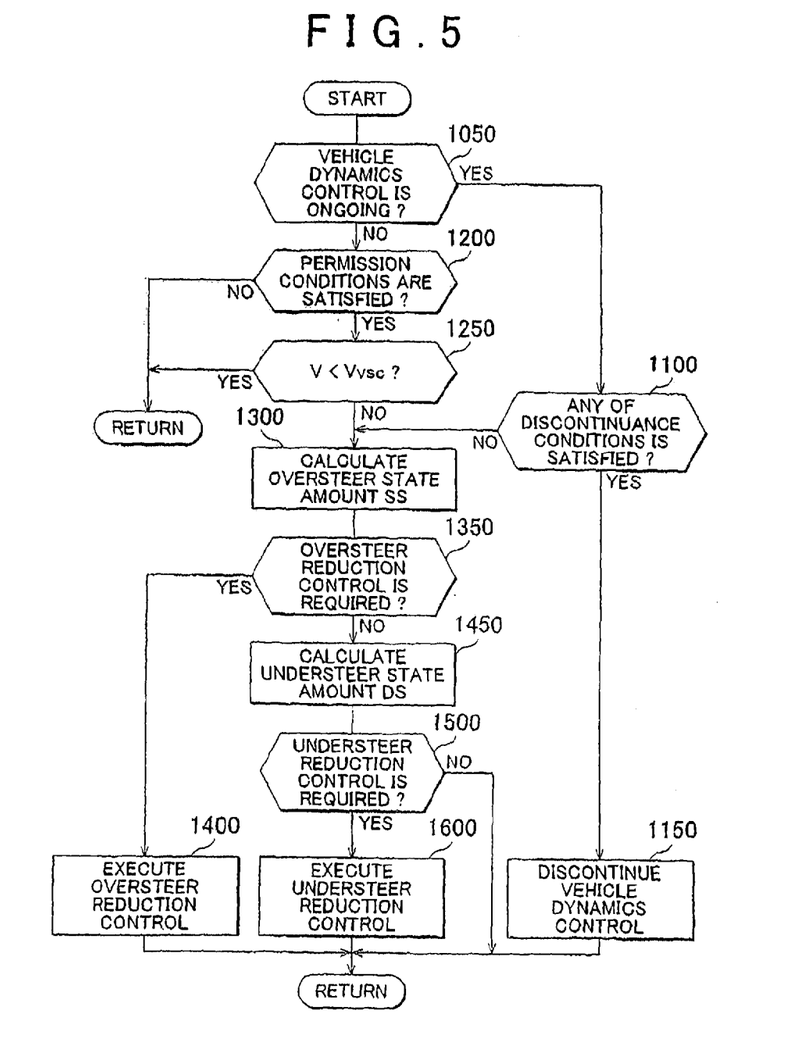
FIG. 5 is a flowchart illustrating the procedure of vehicle dynamics control in the second example embodiment.

In FIGS. 4 and 5, the steps corresponding to those shown in FIGS. 2 and 3 are denoted by the same step numbers as those in FIGS. 2 and 3. Further, the control procedures illustrated by the flowcharts in FIGS. 4 and 5 are each started in response to the ignition switch (not shown in the drawings) being turned on and are repeated at given time intervals.

Figure 7:
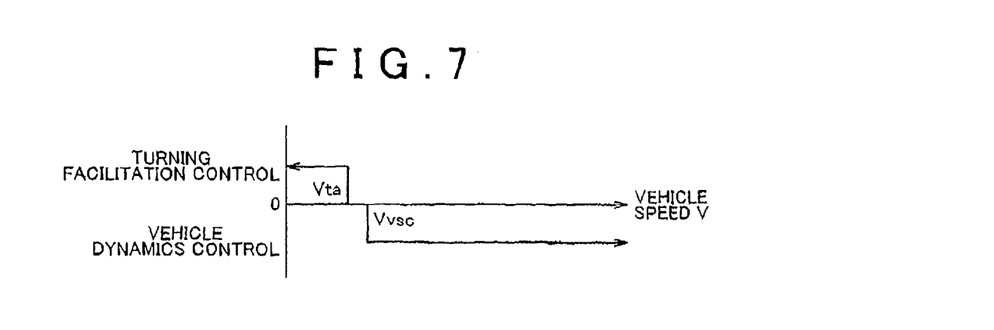
FIG. 7 is a chart illustrating the vehicle speed range in which to permit the braking force application under the turning facilitation control and the vehicle speed range in which to permit the braking force application under the vehicle dynamics control, in the second example embodiment.

In the second example embodiment, referring to FIG. 7, the reference value (upper limit value) Vta for the determination for permitting the turning facilitation control is set lower than a vehicle speed lower limit value Vvsc for permitting the control force application under the vehicle dynamics control. Therefore, the vehicle speed range in which to permit the control force application under the turning facilitation control does not overlap the vehicle speed range in which to permit the control force application under the vehicle dynamics control including the oversteer reduction control and the understeer reduction control.

Referring to FIG. 4, the turning facilitation control in the second example embodiment is executed in basically the same manner as the turning facilitation control in the first example embodiment. However, if a negative determination result (NO) is obtained in step 150, the control proceeds to step 250 without executing step 200.

Further, referring to FIG. 5, the vehicle dynamics control in the second example embodiment is executed in basically the same manner as the vehicle dynamics control in the first example embodiment. However, if a positive determination result (YES) is obtained in 1200, the control proceeds to step 1250.

In step 1250, it is determined whether the vehicle speed V is lower than the reference value Vvsc for the determination for permitting the vehicle dynamics control, that is, whether the vehicle speed V is of a value too small to permit the braking force application under the vehicle dynamics control. If the result of the determination is positive (YES), the present cycle of the control is finished. If the result of the determination is negative (NO), on the other hand, the control proceeds to step 1300.

In the second example embodiment, further, even if a positive determination result (YES) is obtained in step 1500, no step corresponding to step 1550 in the first example embodiment is executed, and the control proceeds to step 1600 to start the control force application under the understeer reduction control.

According to the second example embodiment, as such, when a situation occurs where the turning facilitation control needs to be started, braking force starts to be applied to the turning path inner side rear wheel through steps 300 and 350 in the control procedure shown in FIG. 4, and the braking force on the turning path inner side rear wheel is increased until a positive determination result (YES) is obtained in step 400 or 500.

In this way, as in the first example embodiment, a yaw moment directed to facilitate the turning of the vehicle, which occurs due to the difference between the braking force on the left rear wheel and that on the right rear wheel, is exerted on the vehicle, facilitating the turning of the vehicle. Thus, the turning performance of the vehicle is higher than when the control force application under the turning facilitation control is not executed.

Meanwhile, when a situation occurs where the oversteer reduction control needs to be started, braking force is applied to the control target wheel for the oversteer reduction control through step 1400 until a positive determination result (YES) is obtained in step 1100 in the control procedure shown in FIG. 5, thereby reducing the oversteer of the vehicle.

Meanwhile, when a situation occurs where the understeer reduction control needs to be started, braking forces are applied to the respective control target wheels for the understeer reduction control through step 1600 until a positive determination result (YES) is obtained in step 1100, thereby reducing the understeer of the vehicle.

As described above, the vehicle speed (vehicle speed V) range in which to permit the braking force application under the turning facilitation control is from 0 to the reference value Vta, while the vehicle speed range in which to permit the braking force application under the vehicle dynamics control starts from the reference value Vvsc that is larger than the reference value Vta.

Thus, as shown in FIG. 7, the vehicle speed range in which to permit the braking force application under the turning facilitation control and the vehicle speed range in which to permit the braking force application under the vehicle dynamics control do not overlap each other, and thus they can be reliably prevented from interfering with and conflicting with each other.

In particular, in a case where the vehicle speed range in which to permit the braking force application under the turning control partially overlaps the vehicle speed range in which to permit the braking force application under the oversteer reduction control as in the first example embodiment, if it is determined that the braking force application under the oversteer reduction control needs to be executed in a state where the braking force application under the turning facilitation control is being executed and thus the yaw rate of the vehicle is high, the turning facilitation control is discontinued and the oversteer reduction control is started. In such a case, there is a possibility that the turning facilitation control be discontinued and the oversteer reduction control be started.

In contrast, in the second example embodiment, even when the yaw rate of the vehicle becomes high as a result of execution of the braking force application under the turning facilitation control, it is determined, under no circumstance, that the braking force application under the oversteer reduction control needs to be executed. Therefore, there is no possibility that the turning facilitation control be discontinued and the oversteer reduction control be started.

The invention has been described with reference to the example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

For example, while the turning facilitation control applies braking force to the turning path inner side rear wheel until the turning inner side rear wheel is locked in the foregoing example embodiments, the turning facilitation control may be modified to apply braking force(s) to the turning path inner side wheel(s) until its slip amount or braking slip rate equals a reference value, and may be modified to increase the braking pressure(s) on the turning path inner side wheel(s) until the same braking pressure equals a reference value.

Further, while the target pressure-increase gradient is variably set in accordance with the absolute value of the steering angle θ by calculating the target pressure-increase gradient ΔPbrint for the turning path inner side rear wheel based on the absolute value of the steering angle θ in the foregoing example embodiments, the target pressure-increase gradient may be constant.

Figure 8:
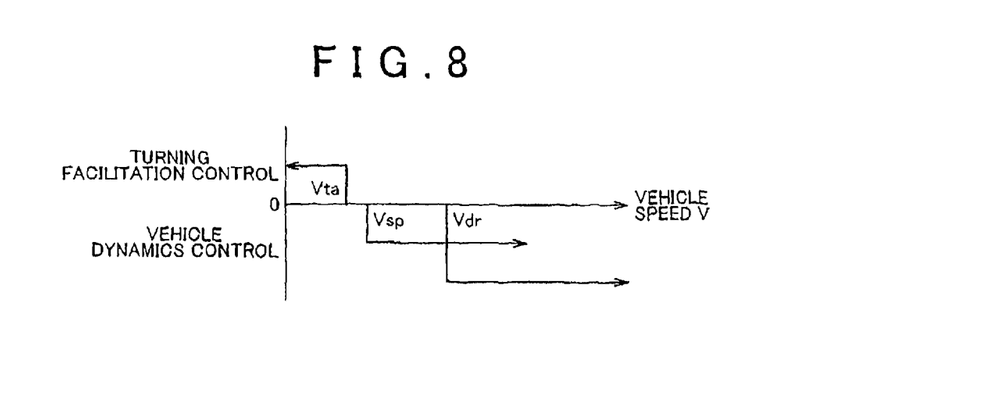
FIG. 8 is a chart illustrating the vehicle speed range in which to permit the braking force application under the turning facilitation control and the vehicle speed ranges in each of which to permit the braking force application under the vehicle dynamics control, in a modification example.

Further, while the reference value Vta for the determination for permitting the turning facilitation control is set lower than the lower limit vehicle speed value Vvsc for permitting the control force application under the vehicle dynamics control in the second example embodiment, the lower limit vehicle speed value Vsp for permitting the control force application under the oversteer reduction control may be set higher than the reference value Vta for the determination for permitting the turning facilitation control and set lower than the lower limit vehicle speed value Vdr for permitting the control force application under the understeer reduction control, as shown in FIG. 8.

While the vehicle is an all-wheel-drive vehicle in the foregoing example embodiments, vehicle travel control apparatuses according to the invention may be applied also to rear-drive vehicles and front-drive vehicles.

Further, while the longitudinal force of each wheel is reduced by applying braking force to the wheel in the foregoing example embodiments, the longitudinal force of each wheel may be reduced, if it is a drive wheel, by reducing the drive force on the wheel or by reducing the drive force on the wheel while applying braking force to it.

Further, while the turning facilitation control applies braking force to the turning path inner side rear wheel in the foregoing example embodiments, it may be modified to apply braking force to the turning path inner side front wheel or apply braking forces, respectively, to the turning path inner side front wheel and the turning path inner side rear wheel, or may be modified to apply braking, force(s) to the turning path inner side wheel(s) while applying drive force(s) to the turning path outer side wheel(s).

Further, while the vehicle dynamics control includes the oversteer reduction control and the understeer reduction control in the foregoing example embodiments, the understeer reduction control may be omitted.

The invention claimed is:

1. A vehicle travel control apparatus comprising:
circuitry configured to execute a turning facilitation control that controls wheel longitudinal force such that a longitudinal force of a turning path inner side wheel becomes smaller than a longitudinal force of a turning path outer side wheel and a vehicle dynamics control that controls wheel longitudinal force so as to stabilize turning motion of the vehicle, wherein
a vehicle speed range in which to permit the turning facilitation control is lower than a vehicle speed range in which to permit the vehicle dynamics control.

2. The vehicle travel control apparatus according to claim 1, wherein the vehicle dynamics control includes an oversteer reduction control, and an upper limit value of the vehicle speed range in which to permit the turning facilitation control is lower than a lower limit value of a vehicle speed range in which to permit the oversteer reduction control.

3. The vehicle travel control apparatus according to claim 1, wherein:
the vehicle dynamics control includes an oversteer reduction control, an upper limit value of the vehicle speed range in which to permit the turning facilitation control is higher than a lower limit value of a vehicle speed range in which to permit the oversteer reduction control, and an lower limit value of the vehicle speed range in which to permit the turning facilitation control is lower than a lower limit value of a vehicle speed range in which to permit the oversteer reduction control.

4. The vehicle travel control apparatus according to claim 3, wherein the turning facilitation control is not started even when a condition for starting the turning facilitation control is satisfied during execution of the oversteer reduction control if a speed of the vehicle is in a vehicle speed range between the lower limit value of the vehicle speed range in which to permit the oversteer reduction control and the upper limit value of the vehicle speed range in which to permit the turning facilitation control.

5. The vehicle travel control apparatus according to claim 3, wherein the turning facilitation control is discontinued when a condition for starting the oversteer reduction control is satisfied during execution of the turning facilitation control if a speed of the vehicle is in a vehicle speed range between the lower limit value of the vehicle speed range in which to permit the oversteer reduction control and the upper limit value of the vehicle speed range in which to permit the turning facilitation control.

6. The vehicle travel control apparatus according to claim 2, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

7. The vehicle travel control apparatus according to claim 3, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

8. The vehicle travel control apparatus according to claim 4, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

9. The vehicle travel control apparatus according to claim 5, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

10. A circuitry implemented method comprising;
executing a turning facilitation control that controls wheel longitudinal force such that a longitudinal force of a turning path inner side wheel becomes smaller than a longitudinal force of a turning path outer side wheel and a vehicle dynamics control that controls wheel longitudinal force so as to stabilize turning motion of the vehicle, wherein
a vehicle speed range in which to permit the turning facilitation control is lower than a vehicle speed range in which to permit the vehicle dynamics control.

11. The circuitry implemented method according to claim 10, wherein the vehicle dynamics control includes an oversteer reduction control, and an upper limit value of the vehicle speed range in which to permit the turning facilitation control is lower than a lower limit value of a vehicle speed range in which to permit the oversteer reduction control.

12. The circuitry implemented method according to claim 10, wherein:
the vehicle dynamics control includes an oversteer reduction control,
an upper limit value of the vehicle speed range in which to permit the turning facilitation control is higher than a lower limit value of a vehicle speed range in which to permit the oversteer reduction control, and
an lower limit value of the vehicle speed range in which to permit the turning facilitation control is lower than a lower limit value of a vehicle speed range in which to permit the oversteer reduction control.

13. The circuitry implemented method according to claim 12, wherein the turning facilitation control is not started even when a condition for starting the turning facilitation control is satisfied during execution of the oversteer reduction control if a speed of the vehicle is in a vehicle speed range between the lower limit value of the vehicle speed range in which to permit the oversteer reduction control and the upper limit value of the vehicle speed range in which to permit the turning facilitation control.

14. The circuitry implemented method according to claim 12, wherein the turning facilitation control is discontinued when a condition for starting the oversteer reduction control is satisfied during execution of the turning facilitation control if a speed of the vehicle is in a vehicle speed range between the lower limit value of the vehicle speed range in which to permit the oversteer reduction control and the upper limit value of the vehicle speed range in which to permit the turning facilitation control.

15. The circuitry implemented method according to claim 11, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

16. The circuitry implemented method according to claim 12, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

17. The circuitry implemented method according to claim 13, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

18. The circuitry implemented method according to claim 14, wherein the vehicle dynamics control includes an oversteer reduction control and an understeer reduction control, and an upper limit value of the vehicle speed range in which to permit the turning facilitation control is lower than a lower limit value of a vehicle speed range in which to permit the understeer reduction control.

* * * * *